Patented Nov. 17, 1925.

1,561,641

UNITED STATES PATENT OFFICE.

WILLIAM A. FARISH, OF BROOKLYN, NEW YORK.

REFRACTORY COMPOSITION.

No Drawing.   Application filed May 31, 1918.   Serial No. 237,403.

*To all whom it may concern:*

Be it known that I, WILLIAM A. FARISH, a citizen of the United States of America, residing in the city of Brooklyn, county of Kings, and State of New York, have invented certain new and useful Improvements in Refractory Compositions, of which the following is a full, clear, and exact description.

The general object of my invention has been to provide a refractory composition which shall have a low co-efficient of expansion and shall be very durable, thus avoiding cracking, disintegrating, corroding and oxidizing.

Another object has been to provide a composition which shall resist chemical action, and one which shall greatly increase the life of the articles which are made therefrom.

Another object has been to provide a refractory composition which is easily and cheaply manufactured, and one in which it is unnecessary to raise to the temperature of recrystallization in order to permanently bind the particles together.

In this specification, I will describe my composition as applied to the construction of a fire brick; it being obvious that it can be used for making any heat resisting articles; such as, crucibles, retorts, muffles, refractories, furnace cores, tubes, combustion boats, and pyrometer tubes.

It is well known to those skilled in the art, that attempts have been made to make fire bricks of silicon carbide with an adhesive material to hold the grains together, such as glue or pitch. In preparing a fire brick or other refractory article, the mass of material has been pressed or molded into shape and subjected to the heat of an electric furnace in which the temperature is raised to about the same temperature as originally used to produce the silicon carbide. At this temperature the silicon carbide is recrystallized with the result that the finished product is very dense, hard, and crisp. The result is that when the brick is subjected to sudden changes of temperature, it usually cracks. The cost of recrystallizing or reconverting silicon carbide is prohibitive for commercial purposes, as the amount of electric energy consumed in bringing it up to the recrystallizing temperature is enormous.

In my composition, I may use any natural chemically inert refractory material, or any refractory, electric furnace product, as a base, such as silicon carbide, fused aluminum oxide, and fused silicon oxide, either singly or in combination. As is well known in the art, fire sand is not a chemically inert refractory electric furnace product, and, therefore, it is not considered to be the equivalent of other refractory, electric furnace product, as such term is employed in this application.

My composition is made up preferably of the following elements in substantially the proportions named:

Silicon carbide, substantially 65 parts.

Tar (or other carbonizing binder) substantially 32 parts.

Borax substantially 3 parts.

The borax is used as a protector for the carbonizing binder, but instead of this salt I may use some other metallic or non-metallic salt, such as potassium silicate or sodium silicate, or a clay of low fusion point. Either of these protectors may be used separately or they may be combined. Furthermore, I may use some other carbonizing binder, such as pitch or molasses in conjunction with the silicon carbide or its equivalent. The use of the salt or clay is to protect the carbon in the carbonizing binder from oxidation.

In making the fire brick, the ingredients of my refractory composition are thoroughly mixed and pressed in the usual manner. After the brick is formed, it is baked in a low temperature (approximately 1000° C.), after which it is ready for use.

While I have set forth certain proportions of the different ingredients, it is obvious that they may be varied somewhat without departing from my invention.

Having thus described my invention, what I claim is:

1. A non-recrystallized refractory composition, consisting of a refractory, electric furnace product, a carbonizing binder, and borax.

2. A non-recrystallized refractory composition, consisting of silicon carbide, a carbonizing binder, and borax.

3. A non-recrystallized refractory composition, consisting of substantially 65% of silicon carbide, substantially 32% of a carbonizing binder, and substantially 3% of a salt which will form a fusion mixture.

4. A non-recrystallized refractory composition, consisting of substantially 65% of silicon carbide, substantially 32% of tar, and substantially 3% of a salt which will form a fusion mixture.

5. A non-recrystallized refractory composition, consisting of substantially 65% of silicon carbide, substantially 32% of tar, and substantially 3% of borax.

In testimony whereof, I have hereunto signed my name.

WILLIAM A. FARISH.